United States Patent [19]

Watanabe et al.

[11] Patent Number: 4,931,251

[45] Date of Patent: Jun. 5, 1990

[54] EXPERIMENTAL NUCLEAR FUSION REACTOR

[75] Inventors: Kenji Watanabe, 2-3-2, Mitsukeyama, Ibaraki City, Osaka; Tadao Uyama, Minoo; Norio Satomi, Hirakata; Masahiro Nishikawa, Sakai; Satorou Yamaguchi, Tokyo; Ichiro Nakazawa, Tokyo, all of Japan

[73] Assignees: Kenji Watanabe; Mitsubishi Denki K bushiki Kaisha, both of Japan

[21] Appl. No.: 319,859

[22] Filed: Mar. 6, 1989

Related U.S. Application Data

[63] Continuation of Ser. No. 867,227, May 27, 1986, abandoned.

[30] Foreign Application Priority Data

May 29, 1985 [JP] Japan .................................. 60-118175

[51] Int. Cl.⁵ .............................................. G21B 1/00
[52] U.S. Cl. ................................... 376/128; 376/137; 376/143; 376/144
[58] Field of Search ............... 376/128, 107, 125, 143, 376/133, 137, 127, 130, 129, 139–141, 144, 145

[56] References Cited

U.S. PATENT DOCUMENTS 3,132,996  5/1964  Baker et al. ........................ 376/107
4,601,871  7/1986  Turner ................................ 376/107

FOREIGN PATENT DOCUMENTS 1292624  3/1962  France ................................ 376/128
615166  10/1959  Italy .................................... 376/128
0152798  12/1979  Japan .................................. 376/143
846547  8/1960  United Kingdom ................ 376/107
892344  3/1962  United Kingdom ................ 376/108

OTHER PUBLICATIONS

Proceedings of the High Beta Workshop, 1975, Shearer, pp. 78–90.
"Plasma Physics and Controlled Nuclear Fusion Research–1984", International Atomic Energy Agency, Vienna, 1985.
"Slow Formation and Sustainment of Spheromaks by a Coaxial Magnetized Plasma source", Physical Review Letters, vol. 51, No. 1, Jul. 1983.
"Formation of Magnetized Plasma Stream in the CTCC-1 Experiment", Ikegami et al., Technology Reports of the Osaka University, vol. 31, No. 1609, 1981.

Primary Examiner—Harvey E. Behrend
Attorney, Agent, or Firm—Leydig, Voit & Mayer

[57] ABSTRACT

An experimental nuclear fusion reactor comprising a coaxial plasma gun which has an outer electrode and an inner electrode arranged coaxially with each other, a metallic container which generates an annular plasma round a center conductor and which holds a poroidal magnetic flux, an inlet which introduces a plasma from the coaxial plasma gun into the container, and conductor members which electrically connect the center conductor, either of the outer and inner electrodes, the inlet and the container in succession so as to form a closed circuit, wherein current to flow through the closed circuit is controlled to hold a toroidal magnetic flux of the annular plasma.

3 Claims, 5 Drawing Sheets

EXPERIMENTAL NUCLEAR FUSION REACTOR

This application is a continuation of application is a continuation of application Ser. No. 867,227, filed May 27, 1986, now abandoned.

BACKGROUND OF THE INVENTION

This invention relates to an experimental nuclear fusion reactor, and more particularly to an experimental nuclear fusion reactor which generates an annular plasma with a coaxial plasma gun.

FIG. 1 shows an experimental nuclear fusion reactor in a prior art. Numeral 1 designates a metallic container which has a drum-shaped outer periphery, and in which a cylindrical center conductor 2 is centrally arranged. A plasma inlet 3 is constructed of a metallic tube in order to introduce an annular plasma into the container 1, a coaxial plasma gun (also called "Marshall gun") 4 serves to generate the annular plasma, and the annular plasma 5 is confined in the container 1. Numeral 6 indicates a vacuum vessel. Numerals 7 and 8 indicate the outer electrode and inner electrode of the coaxial plasma gun, respectively, which are arranged concentrically with each other.

Owing to the above construction, the coaxial plasma gun 4 executes an electric discharge to produce the annular plasma, and the produced plasma is introduced into the confinement container 1 through the inlet 3 and is settled in the state of the annular plasma 5 as shown in the figure. The annular plasma 5 thus settled in the container 1 has a poloidal magnetic flux interlinking with the plasma and a toroidal magnetic flux concentric with the plasma. When let stand, both the magnetic fluxes diffuse spatially. Consequently, the plasma diffuses and cannot be kept confined. Since, however, the container 1 is made of metal, an induced current flows in the toroidal direction of the container 1 and impedes the diffusion of the poloidal magnetic flux, so that the plasma can be held and confined within the container 1.

In the prior-art experimental nuclear fusion reactor described above, there is no current path in the poloidal direction. This has led to the problem that the toroidal magnetic flux cannot be held and diffuses out of the container, the diffusion affects the confinement of the plasma, and the confinement performance is not enhanced.

SUMMARY OF THE INVENTION

This invention has been made in order to solve the problem as described above, and has for its object to provide an experimental nuclear fusion reactor which can hold or control a toroidal magnetic flux in addition to a poloidal magnetic flux.

In the experimental nuclear fusion reactor according to this invention, to the end of establishing a current path in the poloidal direction within a flux holding container for plasma confinement, a center conductor, an electrode in a plasma gun and a plasma inlet as well as the container are electrically connected to form a closed circuit, the current of which is controlled. In this invention, since the current path in the poloidal direction is formed by the closed circuit, the diffusion of the toroidal magnetic flux confined within the container is impeded by an induced current passing through the current path, and a plasma is stably held within the container.

BRIEF DESCRIPTION OF THE DRAWINGS

In the drawings, the same symbols indicate identical or corresponding portions.

DESCRIPTION OF THE PREFERRED EMBODIMENTS

Figure 2:
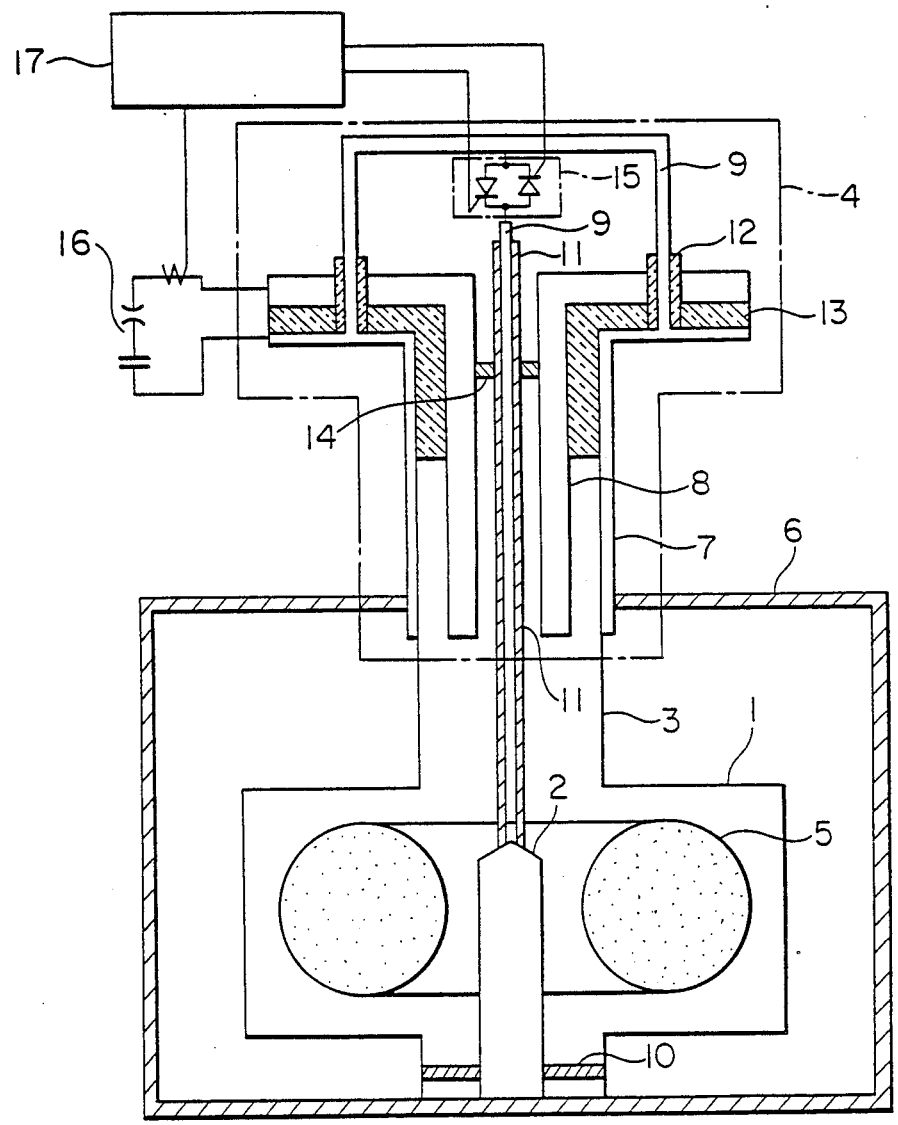
FIG. 2 is a front sectional view of an embodiment of this invention.

FIG. 2 shows one embodiment of this invention. The embodiment comprises conductor members 9 and 10 which electrically connect a center conductor member 2 and a container 1, an insulator member 11 which electrically insulates the conductor member 9 from a plasma 5 as well as an inner electrode 8, an insulator member 12 which establishes the electrical insulation between the conductor member 9 and the inner electrode 8, an insulating seal 13 which establishes the electrical insulation between an outer electrode 7 and the inner electrode 8 and which establishes the vacuum isolation of the interior of a coaxial plasma gun 4 from the atmospheric air, and a vacuum seal 14 which establishes the vacuum isolation of the interior of the coaxial plasma gun 4 from the atmospheric air. The embodiment further comprises a thyristor switch 15 which is electrically connected between parts of the conductor member 9 cut halfway, and to which a trigger device 17 led from a power source 16 is connected.

Figure 1:
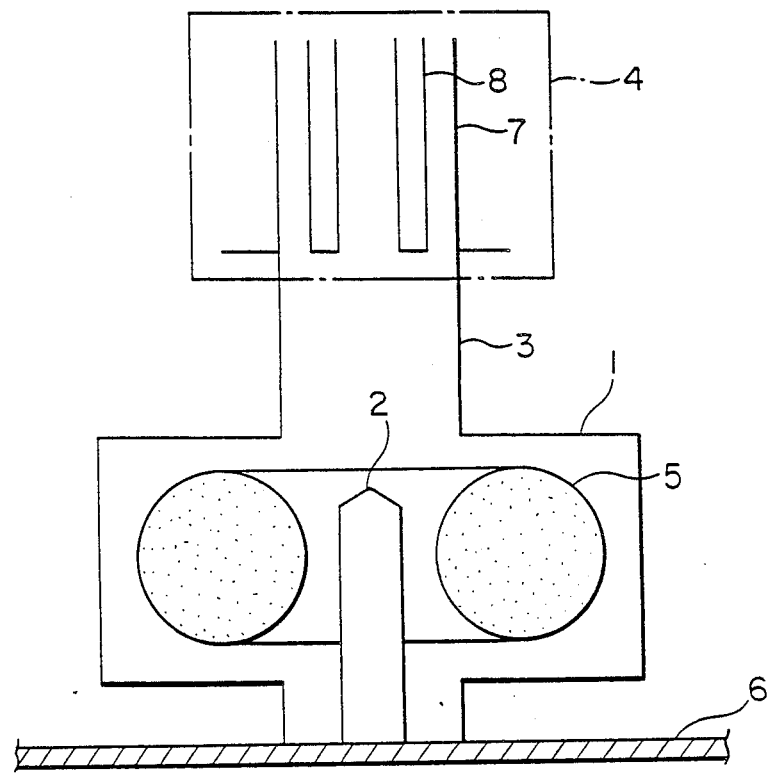
FIG. 1 is a schematic front sectional view of an experimental nuclear fusion reactor in a prior art.

Besides, the same symbols as in FIG. 1 denote identical portions.

Figure 3:
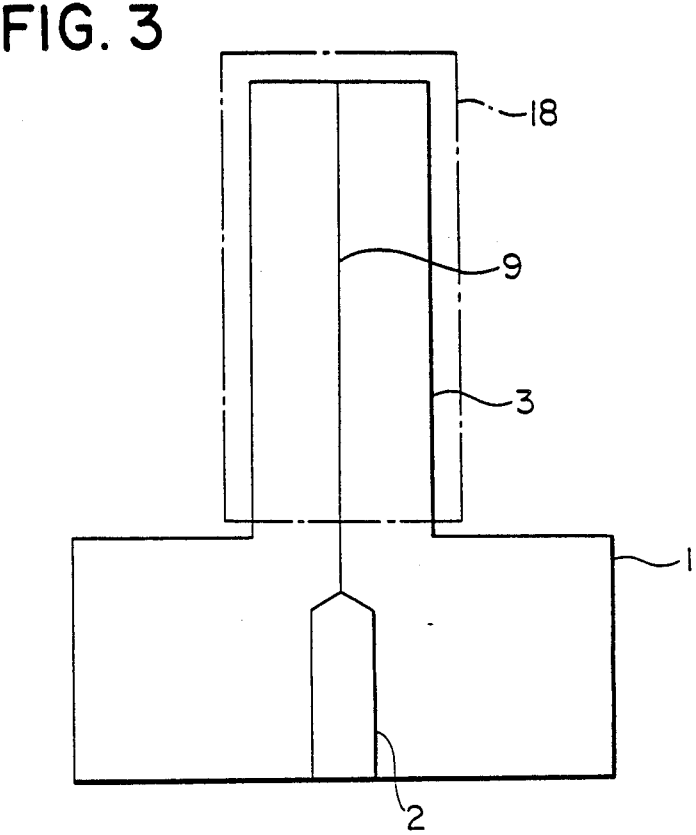
FIG. 3 is a model view of essential portions in FIG. 2.
Figure 4:
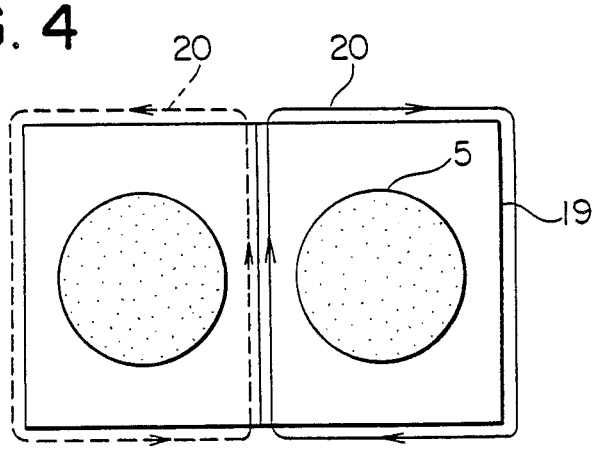
FIG. 4 is a view of an equivalent circuit corresponding to FIG. 2.

Owing to the above construction, the center conductor 2 and the container 1, and the former and the outer electrode 7 are electrically connected by the respective conductor members 10 and 9. The outer electrode 7 is electrically connected with the metal cylinder of the inlet 3, and in turn, this metal cylinder is electrically connected with the container 1. Thus, when the thyristor switch 15 disposed midway of the conductor member 9 is in its "on" state, a closed circuit is formed by the center conductor member 2, the inner or central part of the conductor member 9, the thyristor switch 15, the outer part of the conductor member 9, the outer electrode 7, the inlet 3, the container 1 and the conductor member 10. This is illustrated in FIG. 3 in model-like fashion. In illustrated manner, a current path in the poloidal direction is formed. Moreover, a part indicated by numeral 18 as corresponds to the portions of the coaxial plasma gun 4 and the inlet 3 forms a coaxial structure and exhibits a very low impedance. Therefore, when this part 18 is neglected and the aforementioned closed circuit is considered to be electrically connected at the opening of the container 1, equivalently the structure of the container 1 becomes as indicated by numeral 19 in FIG. 4, and the current path can be regarded as being closed in only the portion of the container 1. Accordingly, an induced current in the poloidal direction indicated by arrows 20 flows through the container 1, whereby a toroidal magnetic flux can be held.

When the thyristor switch 15 is in the "on" state at the timing at which the plasma 5 is generated by the coaxial plasma gun 4, the closed circuit intends to hold the initial null toroidal flux. In order to prevent this drawback, the thyristor switch 15 is triggered by the trigger device 17 after the generation of the plasma 5 has ended. Then, an electromotive force induced in the current path in the poroidal direction renders the thyristor switch 15 "on" to close the current path, so that the toroidal magnetic flux of the annular plasma 5 can be held. As regards the triggering of the thyristor switch 15, current flowing through the coaxial plasma gun 4 is measured, and it is detected that the current has become null. Trigger pulses may be kept impressed since the time of the detection.

Figure 5:
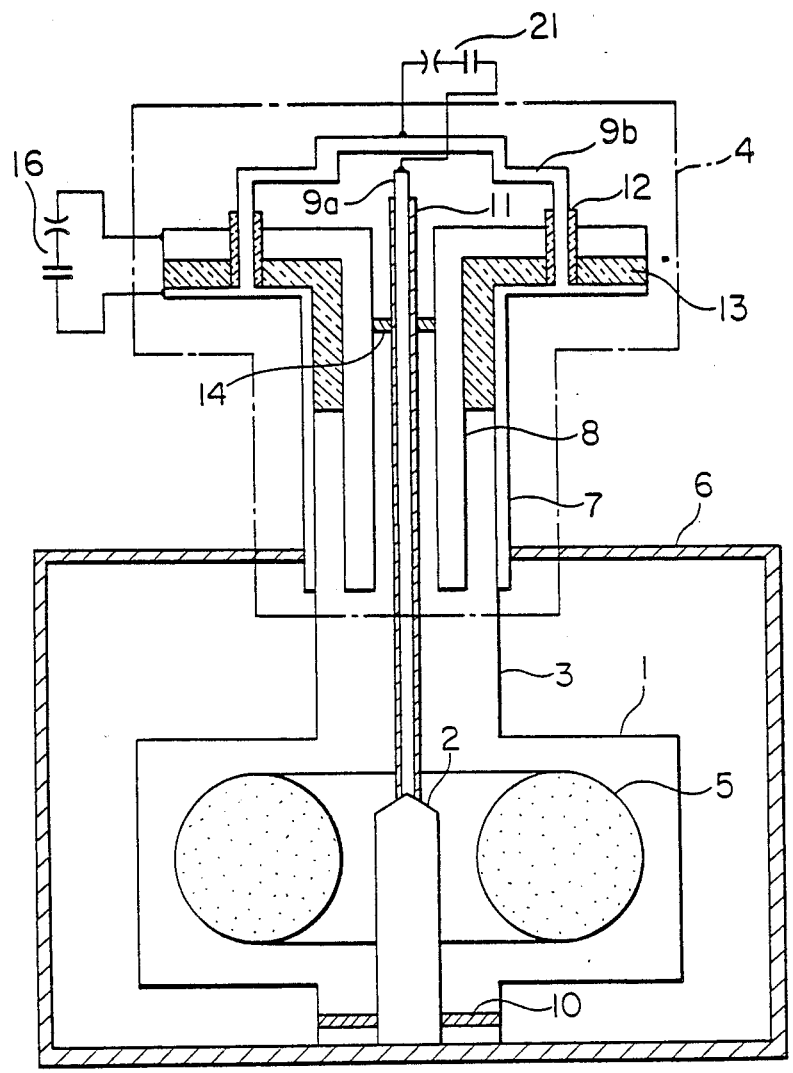
FIG. 5 is a front sectional view of another embodiment.

In the above embodiment, the center conductor member 2 and the container 1 have been electrically connected. It is also allowed that, as shown as another embodiment in FIG. 5, another proper power source 21 is connected between a conductor member 9a on the side of the center conductor member 2 and a conductor member 9b on the side of the container 1 so as to conduct current therebetween.

Owing to such construction, the toroidal magnetic flux can be injected into the annular plasma 5 externally by the current conduction from the power source 21. If the direction of the toroidal flux possessed by the annular plasma 5 is the same as that of a toroidal flux formed by the current conduction, a magnetic field orientation as in a TOKAMAK plasma is established. On the other hand, if the directions of the magnetic fluxes are opposite to each other, a magnetic field orientation as in an RFP (reverse field pinch) plasma is established. In both the cases, aspect ratios close to 1 (one) can be attained.

Figure 6:
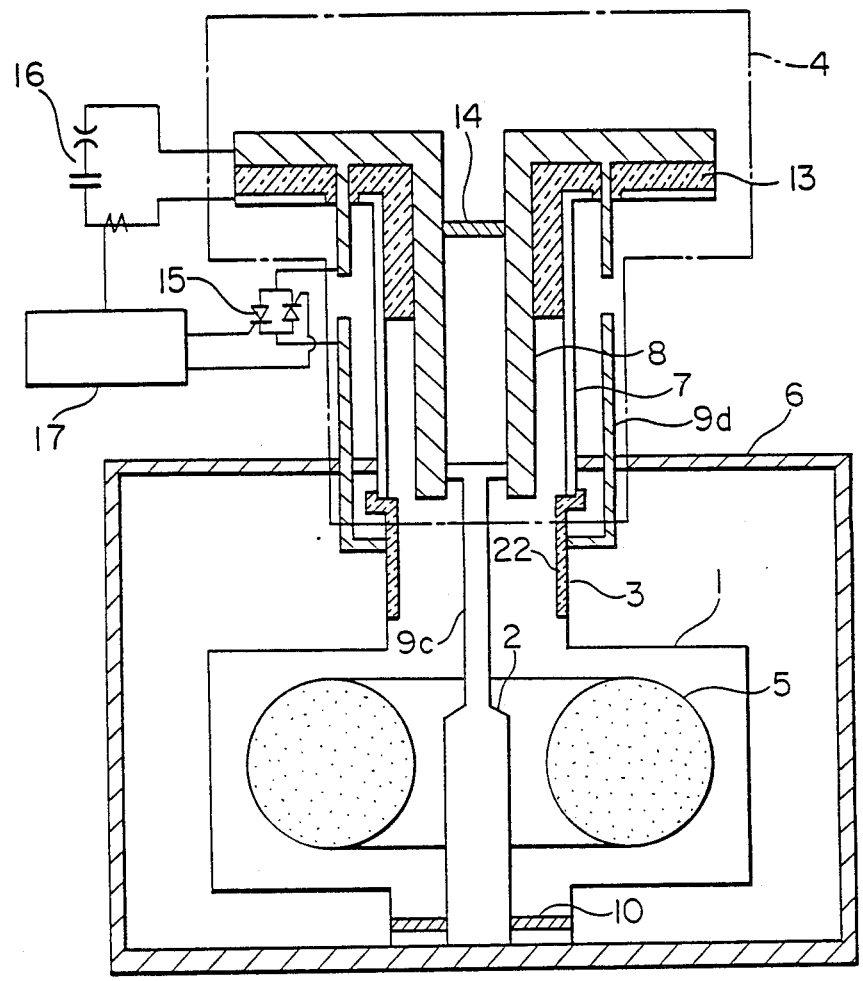
FIG. 6 is a front sectional view of still another embodiment.

While, in the foregoing embodiments, the center conductor member 2 has been connected with the container 1 with the electrical insulation held from the inner electrode 8, still another embodiment as shown in FIG. 6 is also possible. That is, the center conductor member 2 and the inner electrode 8 are electrically connected by a conductor member 9c, a conductor member 9d is extended from the inner electrode 8 through the outer space of the outer electrode 7 into the vacuum vessel 6, and this conductor member 9d is electrically connected with the inlet 3 which is electrically disconnected from the outer electrode 7. Since, even with such construction, the conductor member 9d and the outer electrode 7 hold a coaxial structure, a current path in the poroidal direction is secured as in the operations of the preceding embodiments, and effects similar to those of the preceding embodiments are achieved. An insulator member 22 is disposed so as to prevent the discharge between the inner electrode 8 and the inlet 3 through the plasma which spurts from the coaxial plasma gun.

As understood from the above description, according to this invention, a center conductor member, an electrode in a plasma gun, an inlet and a poroidal flux holding container are connected by conductor members to form a closed circuit, thereby making it possible to hold or control a toroidal flux, so that the toroidal and poroidal fluxes can be held. The invention is therefore effective to remarkably enhance the confinement performance of holding a plasma which twines round the magnetic fluxes.

What is claimed is:

1. An experimental nuclear fusion reactor comprising:
   a coaxial plasma gun which has an outer electrode and an inner electrode arranged coaxially with each other,
   a metallic container means, including a center conductor, for containing an annular plasma around said center conductor and holding a poloidal magnetic flux, said center conductor extending substantially the height of the plasma,
   inlet means for introducing a plasma from said coaxial plasma gun into said container means,
   conductor members which electrically connect said center conductor, either of said outer electrode and said inner electrode, said inlet means and said container means in succession so as to form a closed circuit, and
   a device disposed in the closed circuit and including means for establishing current flow through said closed circuit to hold a toroidal magnetic flux of the annular plasma.

2. An experimental nuclear fusion reactor according to claim 1 wherein the device includes a thyristor switch which is inserted in said closed circuit and a trigger device which actuates said thyristor switch.

3. An experimental nuclear fusion reactor according to claim 1 wherein the device includes a power source means, which is inserted in said closed circuit, for injecting a toroidal magnetic flux into the annular plasma so as to control a plasma orientation.

* * * * *